(No Model.)

F. E. DAVIS.
GANG PLOW.

No. 531,622. Patented Jan. 1, 1895.

Witnesses,

Inventor,
Frank E. Davis
By Offield, Towle & Linthicum
Atty's.

UNITED STATES PATENT OFFICE.

FRANK E. DAVIS, OF LA CROSSE, WISCONSIN.

GANG-PLOW.

SPECIFICATION forming part of Letters Patent No. 531,622, dated January 1, 1895.

Application filed December 11, 1893. Serial No. 493,324. (No model.)

*To all whom it may concern:*

Be it known that I, FRANK E. DAVIS, a citizen of the United States, residing at La Crosse, in the county of La Crosse and State of Wisconsin, have invented certain new and useful Improvements in Gang or Sulky Plows; and I do declare the following to be a full, clear, and exact description of the invention, such as will enable others skilled in the art to which it appertains to make and use the same, reference being had to the accompanying drawings, and to the figures of reference marked thereon, which form a part of this specification.

The invention relates to the construction of gang or sulky plows, and consists especially in the means employed for raising and lowering the plows out of and into operative position.

The object is to provide a simple and efficient means for this purpose, and which shall operate in such manner as to raise and lower the plow beams, and consequently the forward part of the beam and point of the plow, with greater rapidity than the rear part of the beam and the heel of the plow, and at the same time to give a greater limit of movement to the point of the plow than to the heel.

The invention is illustrated in the accompanying drawings, in which—

Figure 1:
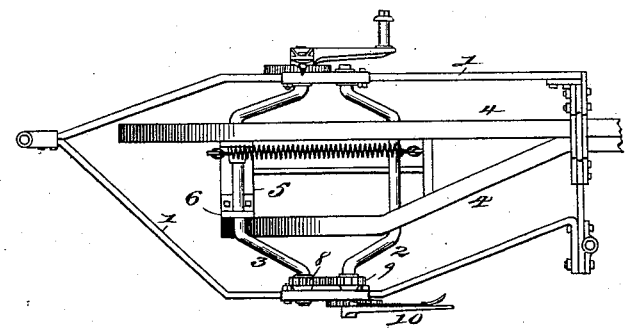
Figure 2:
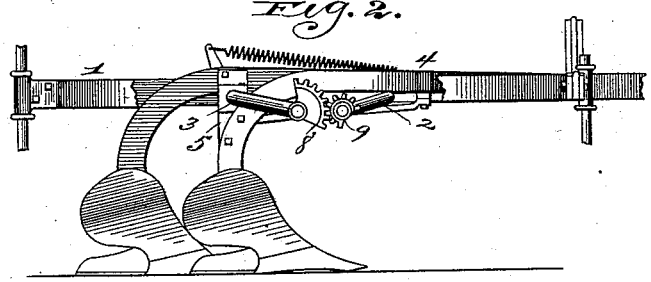

Figure 1 is a partial plan view; and Fig. 2 is a side elevation parts broken away.

The plows are carried by a frame 1, mounted in the ordinary manner upon three wheels, across the frame from one side to the other, and mounted in suitable bearings thereon are two bails, 2 and 3, to the rear one (3) of which the plow beams (4) are connected by means of a casting (5), uniting the two beams and having on the side thereof a bearing (6) through which the bail (3) passes. The other bail (2) is situated a short distance in advance of the bail (3) just described, and the beams are supported by resting upon it. The two beams are attached together at their forward end, and the usual draft appliances are secured thereto. Upon one side of the frame (1), and generally inside of the frame, there are mounted upon the end of the bails (2 and 3) a pair of intermeshing segment gears (8 and 9). To the forward segment (9) or to the end of its bail, is attached the usual lifting lever (10) by means of which the bails are operated.

The operation is as follows: The plows being in their lowest or working position, a slight rearward movement of the lifting lever causes both bails to begin to rise, the forward one rising with greater rapidity than the rear one, on account of the smaller diameter of its segment gear. The result is to lift the point of the plow from the ground somewhat earlier than the heel. The movement of the lifting lever being continued, both beams are simultaneously raised, until such time as the forward bail has nearly reached the highest point in its throw. At this point the lifting movement has almost entirely ceased, the tendency of the rear bail being to throw the beams in a forward direction. The rear bail is so adjusted in length and position relative to the forward bail, that when raised, as when not in service, the point of the plow is pointed slightly in an upward direction, making less liability of its becoming obstructed or caught in any way in its movement from one place to another.

In lowering the plow the operation is practically reversed.

To assist in raising the plows, there is secured to casting 5 an arm (as 10) which is connected by a heavy coiled spring to the other bail in such a manner that its tension acts to throw the bails in a direction to assist in lifting the beams in drawing them together. The tension may be varied to suit varying circumstances, by attaching the spring to the arm at a greater or less distance from the bail.

I claim as my invention—

1. In a gang or sulky plow, the combination of a frame, two bails mounted in bearings on opposite sides of said frame, intermeshing segment gears upon one end of said bails, plow beams mounted upon one of the said bails and resting upon the other, and a lifting lever attached to one of said bails or segments, substantially as and for the purpose herein specified.

2. In a gang or sulky plow, the combination of a frame, two bails mounted in bearings on opposite sides of said frame, intermeshing segment gears upon one end of said bails, a lifting lever attached to one of said bails, two plow beams united by said casting and supported by it and by the other of said bails, a radial arm secured to the casting, and a coiled spring secured to the end of said arm and to the other bail, substantially as and for the purpose herein specified.

In testimony whereof I affix my signature in presence of two witnesses.

FRANK E. DAVIS.

Witnesses:
BERT E. EDGELL,
F. W. SEAGER.